United States Patent [19]
Deutsch et al.

[11] Patent Number: 5,542,052
[45] Date of Patent: Jul. 30, 1996

[54] APPLYING TRAPS TO A PRINTED PAGE SPECIFIED IN A PAGE DESCRIPTION LANGUAGE FORMAT

[75] Inventors: Keith R. Deutsch, Amherst; Per H. Bjorge, Hollis; Alan Blannin, Amherst, all of N.H.; Eric J. Bean, Kent, Wash.; Douglas L. Peltonen, Seattle, Wash.; Timothy H. Roth, Issaquah, Wash.

[73] Assignee: Adobe Systems Incorporated, Mountain View, Calif.

[21] Appl. No.: 188,246

[22] Filed: Jan. 26, 1994

Related U.S. Application Data

[63] Continuation-in-part of Ser. No. 664,064, Mar. 4, 1991, Pat. No. 5,295,236.

[51] Int. Cl.⁶ ........................................ G06T 11/40
[52] U.S. Cl. ........................................ 395/131; 395/134
[58] Field of Search ........................... 395/100, 118, 395/144, 145, 146, 147, 148, 131, 134, 135, 117, 109

[56] References Cited

U.S. PATENT DOCUMENTS

| | | | |
|---|---|---|---|
| 4,115,816 | 9/1978 | Moe et al. | 358/283 |
| 4,464,677 | 8/1984 | Kuhn et al. | 358/75 |
| 4,583,116 | 4/1986 | Hennig et al. | 358/75 |
| 4,603,431 | 7/1986 | Grover et al. | 382/56 |
| 4,683,492 | 7/1987 | Sugiura et al. | 358/80 |
| 4,815,009 | 3/1989 | Blatin | 395/134 |
| 4,817,187 | 3/1989 | Lien | 382/56 |
| 4,821,336 | 4/1989 | Roye | 382/56 |
| 4,824,761 | 4/1989 | Sturgis et al. | 430/209 |
| 4,849,907 | 7/1989 | Aotsu et al. | 364/518 |
| 4,852,485 | 8/1989 | Brunner | 101/211 |
| 4,916,484 | 4/1990 | Ohlig | 355/91 |
| 4,931,861 | 6/1990 | Taniguchi | 358/75 |
| 5,029,115 | 7/1991 | Geraci | 364/523 |
| 5,043,711 | 8/1991 | Harrington | 340/728 |
| 5,103,407 | 4/1992 | Gabor | 395/131 |
| 5,113,249 | 5/1992 | Yosefi | 358/75 |
| 5,113,491 | 5/1992 | Yamazaki | 395/141 |
| 5,115,402 | 5/1992 | Matsushiro et al. | 395/141 |
| 5,131,058 | 7/1992 | Ting et al. | 382/47 |
| 5,246,927 | 11/1993 | Miyoshi et al. | 395/131 |
| 5,271,096 | 12/1993 | Cook | 395/131 |
| 5,295,239 | 3/1994 | Murakami | 395/151 |
| 5,297,240 | 3/1994 | Priem et al. | 395/134 |
| 5,315,693 | 5/1994 | Hirosawa | 395/128 |
| 5,355,446 | 10/1994 | Maayan | 395/134 |
| 5,408,595 | 4/1995 | Tajima | 395/131 |

*Primary Examiner*—Mark K. Zimmerman
*Assistant Examiner*—Cliff N. Vo
*Attorney, Agent, or Firm*—Christensen, O'Connor, Johnson & Kindness PLLC

[57] ABSTRACT

A trapping technique that accepts a Postscript or other page description language (PDL) file and outputs a file in PDL format having the correct traps. The input page is first divided into subportions, or tiles, and the tiles are individually processed by evaluating the input file in a corresponding dipping window. Each tile is then analyzed to determine the presence of boundaries or intersections between page objects or color regions. A trapping analyzer generates trap vectors in accordance with a set of desired trapping rules which take into account existing traps and the proximity of other page objects. In a preferred embodiment, the trap vectors are then convened to PDL form.

17 Claims, 19 Drawing Sheets

```
% sample postscript code segment
% describes a cyan triangle partially overlaying a key diamond shape
% on a yellow background gsave
%scale background rectangle to supertile size at 300 dpi virtual scan
.9216 .9216 scale % set background color (CMYK)
0 0 1 0 setcmykcolor
% create and fill background
newpath
0 0 moveto 0 25 lineto 25 0 lineto closepath fill
% set fill color to key
0 0 0 1 setcmykcolor
% create and fill key diamond shape
newpath
10 7.5 moveto 5 12.5 lineto 15 12.5 lineto closepath fill
%set fill color to cyan
1 0 0 0 setcmykcolor
% create and fill cyan triangle
newpath
20 7.5 moveto 12 12.5 lineto closepath fill grestore
```

FIG. 5

300

| VECTOR | LEFT COLOR | RIGHT COLOR | |
|---|---|---|---|
| (11.52, 10.8) to (12.51, 10.22) | CYAN | KEY | |
| (12.51, 10.22) to (14.4, 9.09) | CYAN | YELLOW | 710 |
| (11.52, 9.8) to (12.51, 10.22) | KEY | YELLOW | |

FIG. 7

| VECTOR | COLOR | |
|---|---|---|
| (11.52, 10.3) to (12.51, 9.72) | CYAN/YELLOW | |
| (12.51, 10.52) to (14.4, 9.59) | KEY/CYAN | 810 |
| (11.52, 9.8) to (12.51, 10.72) | KEY/YELLOW | |

FIG. 8

```
1 setlinewidth
1 1 0 0 setcmykcolor
11.52 10.3 moveto 12.51 9.72 lineto stroke     } 910
1 0 1 0 setcmykcolor
12.51 10.52 moveto 14.4 9.59 lineto stroke
11.52 9.8 moveto 12.51 10.72 lineto stroke
```

APPLYING TRAPS TO A PRINTED PAGE SPECIFIED IN A PAGE DESCRIPTION LANGUAGE FORMAT

CROSS-REFERENCE TO RELATED APPLICATIONS

This application is a continuation-in-part of U.S. patent application Ser. No. 07/664,064, filed Mar. 4, 1991, now U.S. Pat. No. 5,295,236, the benefit of the filing of which is hereby claimed under 35 U.S.C. § 120. U.S. patent application Ser. No. 07/664,064 is hereby incorporated by reference. This application is also related to U.S. Pat. application Ser. No. 07/383,400, filed Jul. 21, 1989, now U.S. Pat. No. 5,226,175, entitled "A Technique for Representing Sampled Images," which is also hereby incorporated by reference.

FIELD OF THE INVENTION

This invention relates generally to computer-assisted publishing and particularly to a technique for trapping pages specified in a page description language format.

BACKGROUND OF THE INVENTION

For many years, the preferred process for color printing on paper has been to process each page in multiple exposures, or separations. Each separation exposes selected areas of the paper to an ink of a different color-the usual process ink colors are cyan, magenta, yellow and key (CMYK). Additional color inks are often used as spot colors in additional separation.

High-quality printing, such as that required by the publishing industry, poses many difficult problems in controlling the separations. For example, there is often a problem with positional registration of the various separations. As a result, the several inks are never perfectly aligned with one another, and a small gap between regions of different colors occurs, which is often visible to the eye as a white line.

One common solution to the registration problem is to perform a technique known as trapping. As the separations are built, regions of a particular color are expanded or "spread" beyond their nominal boundaries, or contracted or "choked" within such boundaries. Various photographic trapping techniques are well known. Although these are sometimes tedious to apply, they are justified in expensive publications, such as magazines and newspapers, where time and labor is available to create individual traps for each printed page.

With the current widespread use of computers in publishing, various systems now perform choking and spreading electronically. The usual approach is to first render the page in pixels at the desired output resolution and then store the rendition in a memory referred to as a "frame buffer." Typically, a frame buffer is assigned to each of the four process separations. If spot colors are used, an additional frame buffer is necessary for each spot color. Each frame buffer is choked and spread on a pixel-by-pixel basis, and the result used to control the printing of the respective color. Because this approach requires a frame buffer for each of the output inks, it requires a large hardware expenditure, the cost of which is justified in expensive publications, such as newspapers and magazines.

In recent years, a new class of low-cost applications in the publishing industry has emerged, namely "desktop" publishing. A desktop publishing system user typically uses a standard personal computer to specify his output page as a computer in a page description language (PDL) such as Postscript™. (Postscript is a trademark of Adobe Systems, Incorporated, of Mountain View, Calif.) The Postscript PDL file is typically sent to a PDL-compatible automatic page setter, which then interprets the file and renders the several color separations.

The typical PDL user usually does not know or care about registration of separations—all the user understands is that the color page displayed on the computer screen often does not look the same as the page printed by the priming press due to color alignment errors. In order to avoid errors, a desktop publishing user can manually examine the pages as they are displayed on a computer screen, predict where the registration errors are likely to occur, and then create traps by specifying additional vectors to cover the errors. Unfortunately, this procedure is tedious and undesirable to perform manually. Further, it is difficult to automate, especially for pages having multiple intersecting colored objects.

Thus, what is needed is a way for a desktop publishing user to automatically produce a properly trapped page from a PDL file. This would provide predictable results from a desktop publishing system without the need to provide special instructions to the page setter or incur the cost of using expensive trapping hardware.

SUMMARY OF THE INVENTION

The invention is a method of electronically trapping a printed color page including a plurality of color regions. The method includes the steps of: (a) creating, according to a set of trapping rules, a proposed trap area for a color region of interest; (b) modifying the proposed trap area if one or more color regions are in such close proximity to the color region of interest that an undesirable trap would result without the modification; and (c) creating a trap for the color region of interest which is equivalent to the proposed trap area less any modifications made to the proposed trap area.

In accordance with other aspects of the invention, the method further includes the step of comparing the proposed trap area to color regions to determine if there are any intersections between the two areas and, if one or more intersections are present, modifying the proposed trap area to exclude the color region or regions from the proposed trap area. In another aspect of the invention, the proposed trap area is further modified based upon an exclusionary zone that is defined relative to each color region that intersects the proposed trap area. As an example, for a given color region that intersects the proposed trap area, the exclusionary zone is equal to one-half the distance between the color region of interest and the intersecting color region.

In accordance with still further aspects of the invention, some of the color regions include existing trap areas that were generated prior to determining a trap for a color region of interest. In this case, the method further includes the step of comparing the proposed trap area to existing trap areas to determine if there are any intersections between the two areas and, if one or more intersections are present, modifying one of the trap areas according to a set of trapping rules. In one aspect of the invention, the trap area with the lower neutral density is the area that is modified.

In accordance with still further aspects of the invention, the proposed trap area is modified based upon an exclusionary zone that is defined relative to any color region that necessitates modification of the proposed trap. Such a region is termed a proximate color region. Also, in one embodiment, the exclusionary zone for any proximate region is equal to one-half the distance between the color region of interest and the proximate color region.

In still further aspects of the invention, the color page is expressed in a page description language format. The method further comprising the steps of: (a) reading an input data file which represents the color page expressed in the page description language format; (b) translating the page description language instructions comprising the input data file into a format suitable for detection and analysis of color edges between color regions; and (c) analyzing the translated input data file to identify color edges between the color regions, and using the translated input data file to create the proposed trap. Preferably, the a trapped output file is produced which includes the existing trap areas, with the traps being expressed in the page description language format.

BRIEF DESCRIPTION OF THE DRAWINGS

The above and further advantages of the invention may be better understood by referring to the following description together with the accompanying drawings where in:

FIG. 5 is a Postscript code segment describing the page;

FIG. 7 depicts a list of edge vectors and associated color data for the tile;

FIG. 8 depicts the resulting list of trap vectors for the tile;

FIG. 9 depicts vectors in Postscript form;

DETAILED DESCRIPTION OF THE PREFERRED EMBODIMENT

The following is a description of the architecture of a general purpose computer system used to perform traps in page description language (PDL) form according to the invention. It should be understood that the Postscript PDL, the illustrated exemplary page, and trapping rules discussed herein are for illustration only, and are not meant as limitations on the scope of the invention. As will be better understood shortly, the invention lies in the way in which the input file and trapping rules are used to generate a list of trap vectors which are added to the input file.

Figure 1:
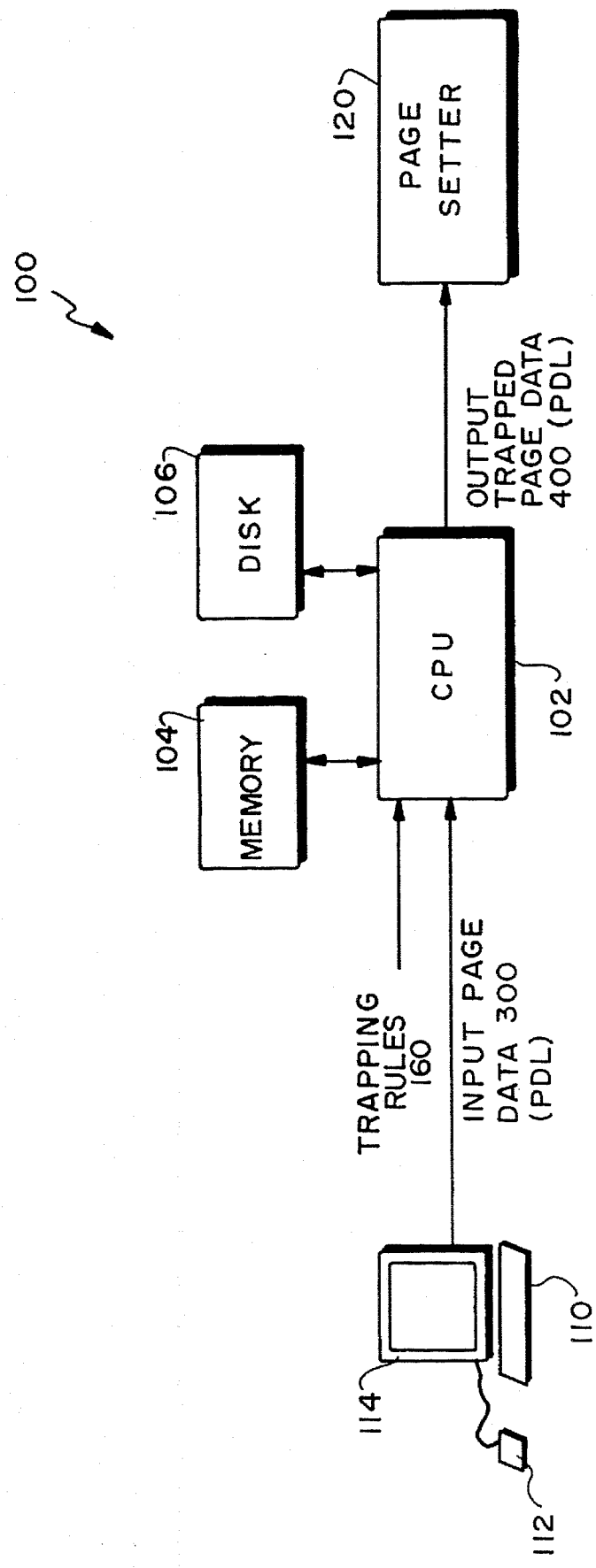
FIG. 1 is a hardware block diagram of a desktop publishing system that traps images according to the invention.

FIG. 1 shows a block diagram of a desktop publishing system 100 including a central processing unit (CPU) 102, a memory 104, and a mass storage device such as a disk drive 106. The system 100 may, for example, be an International Business Machines (IBM™) or compatible personal computer. Peripheral equipment associated with the desktop publishing system 100 includes standard input devices such as a keyboard 110 and mouse 112, and output devices such as a display 114.

Data describing the format of a desired primed page is typically input to the system 100 by a user who interactively specifies the page layout by using the keyboard 110, mouse 112, display 114 and suitable software. The input page data 300 is typically stored in the memory 104 or disk drive 106 in the form of a page description language (PDL) such as the well-known Postscript format. Other devices and methods not shown may also be used to assemble the input page data 300. The input page data 300 may typically include text, graphics, line art and/or scanned images.

After the input page data 300 is entered into the system 100, the CPU 102 then uses a set of trapping rules 160 to produce an output trapped page 400. The trapping rules 160 may be a set of rules specified by the user via the keyboard 110, or may be a preconfigured set of rules stored on the disk drive 106.

The output trapped page 400 is produced in the same PDL format as the input page data 300. The output trapped page 400, being a PDL file, may then be sent to any standard PDL-compatible page-setter 120 or other output device.

Figure 2:
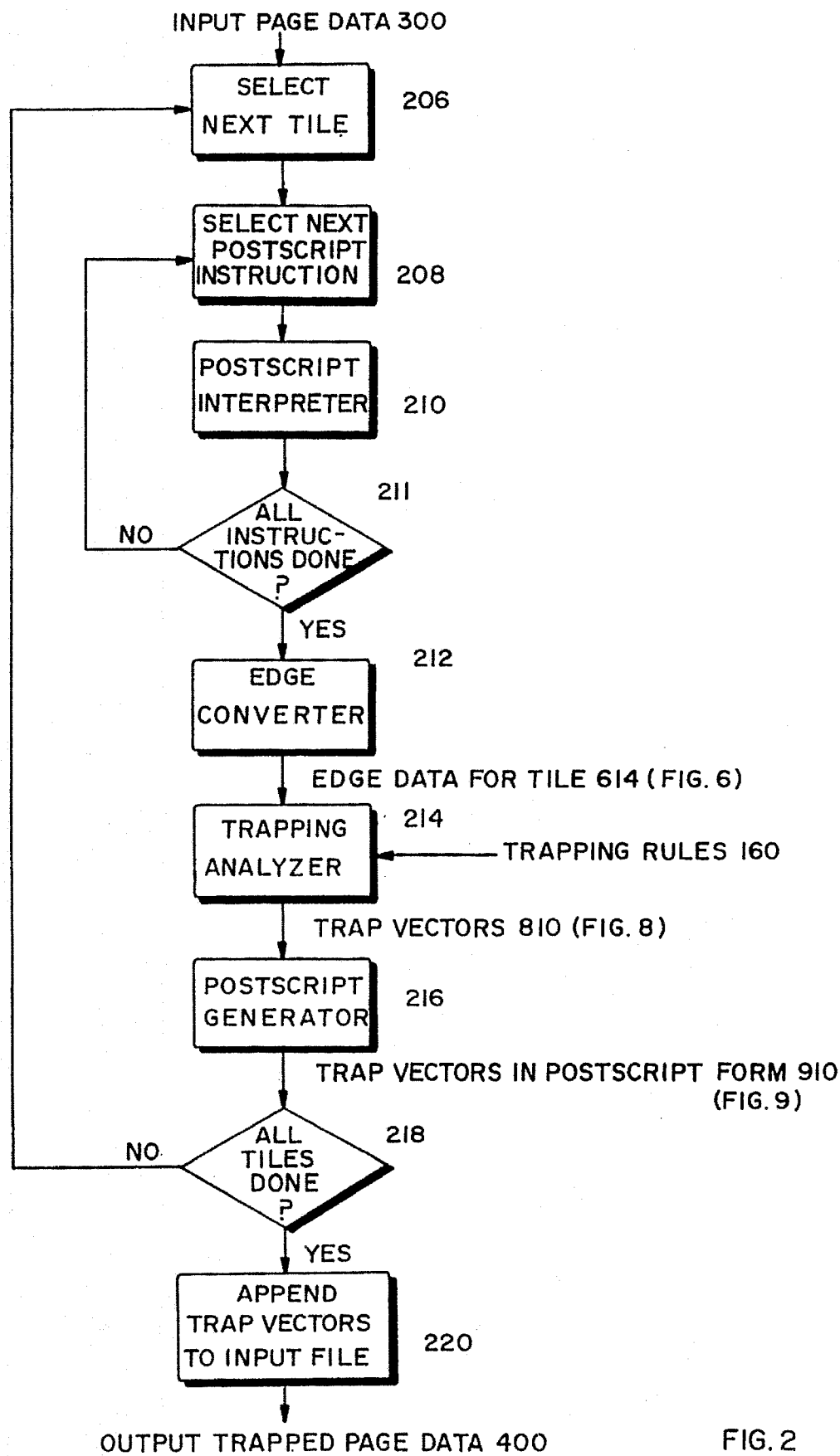
FIG. 2 is a flow chart of the steps performed by the system.

More particularly now, refer to the system software block diagram shown in FIG. 2. In the preferred embodiment, an initial set of instructions, step 206, selects a first subportion, or tile, of the output page.

In the next three steps 208, 210, and 211, the CPU 102 interprets each of the PDL instructions in the input page data 300 to build a representation of the tile which indicates the possible boundaries, or edges, between regions of different color as it will appear on the output page. This is typically done by first selecting the next Postscript instruction in step 208, and then interpreting the instruction by evaluating it within a clipping window which corresponds to the currently selected tile.

Figure 6:
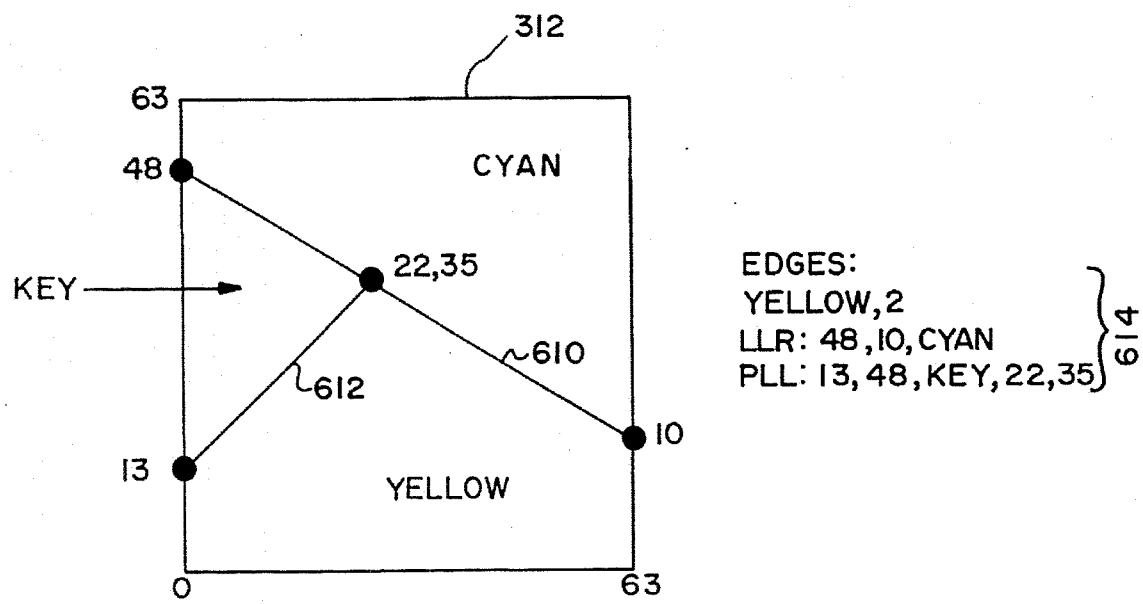
FIG. 6 depicts one tile and the analytic description of the edges within that tile produced by the edge tile converter.

This process continues by looping back through step 211 to convert all of the input PDL instructions. The tile representation is then processed by an edge converter 212, which analyzes the tile representation and outputs information about the edges in the tile in the form of edge data 614 (FIG. 6).

The next set of instructions, referred to as the trapping analyzer 214, uses the edge data 614 and the set of trapping rules 160 to produce a description of the trap vectors 810 in any convenient form.

Step 216 then converts the trap vectors 810 to PDL form, and the process continues by looping back through step 218 until all tiles have been trapped.

The trap vectors for various tiles may be combined or merged to produce a condensed list of trap vectors, if desired, to combine trap vectors from adjacent tiles or from tiles which are overwritten by later PDL instructions. This merging step may typically be part of the generator 216.

A final step 220 appends the trap vectors in PDL form to the input page data 300, to produce the output trapped page data 400.

Figure 3:
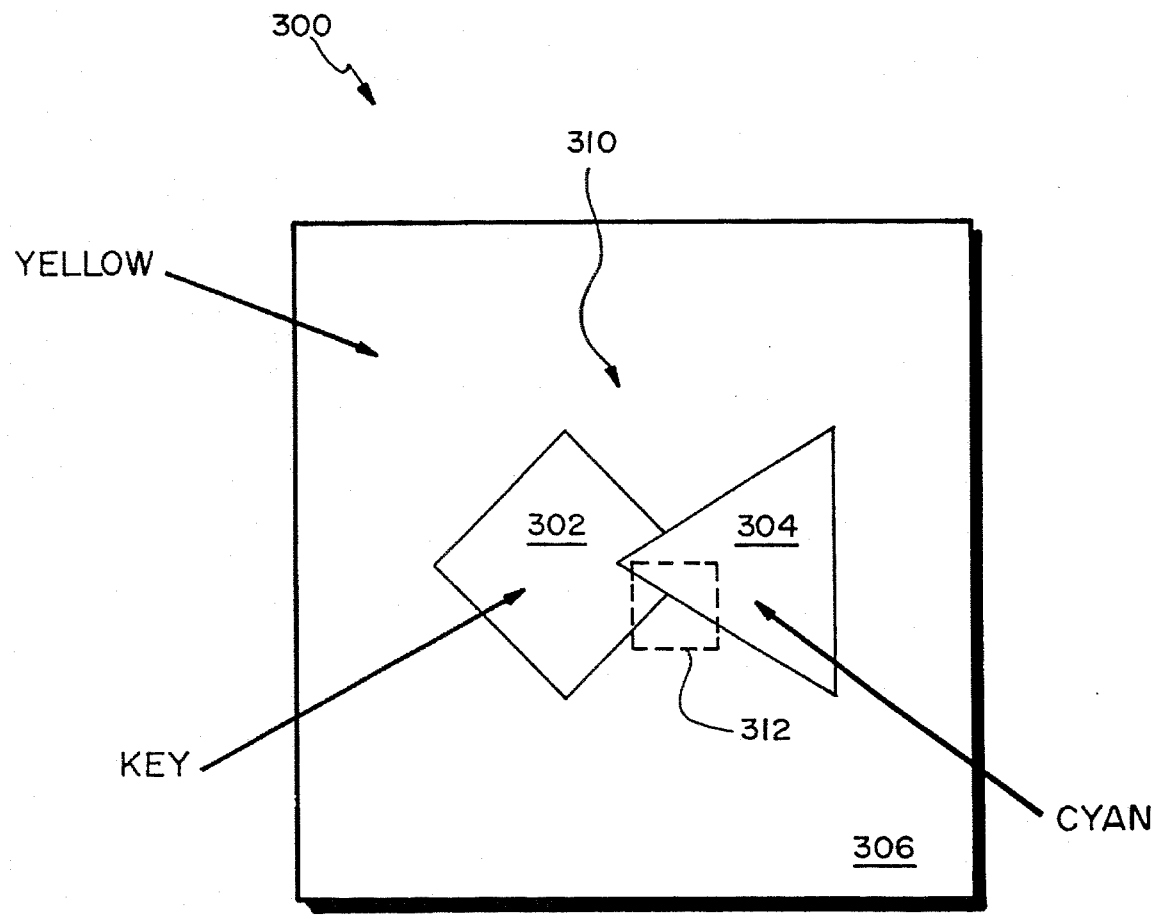
FIG. 3 is an example page, consisting of overlapping objects, which is to be trapped
Figure 4:
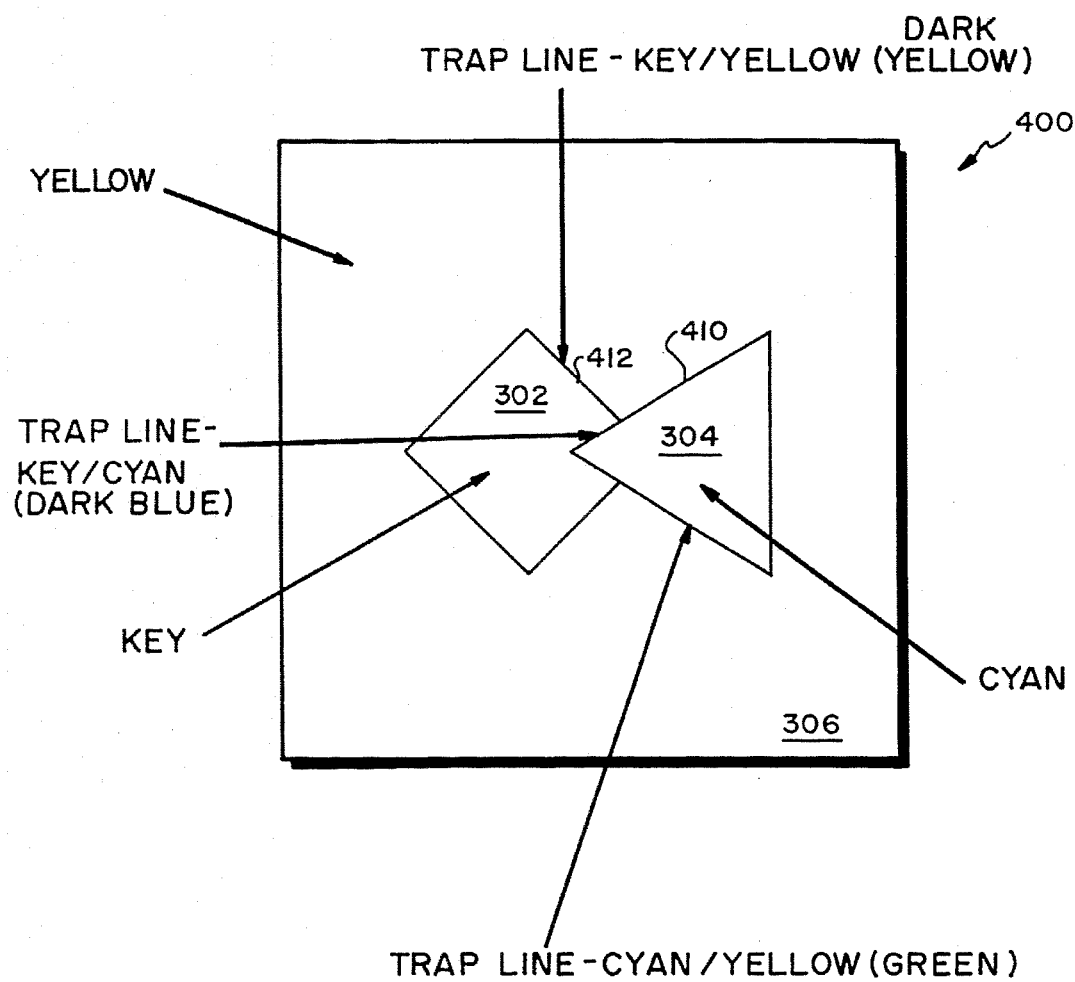
FIG. 4 is the desired trapped output page.

As a further example of how the invention operates, consider an exemplary input page 300 shown in FIG. 3. This input page 300 consists of a key (black) diamond 302 overlapped by a cyan triangle 304 on a yellow background 306. FIG. 4 depicts the desired trapped output page, including the key diamond 302, cyan triangle 304, and yellow background 306, as well as several trap lines, including the four trap lines around the visible edges of the diamond 302, the three trap lines where the triangle meets the background 306, and the two trap lines where the triangle 304 overlaps the diamond 302.

FIG. 5 depicts a Postscript language file corresponding to the input page of FIG. 3. The illustrated Postscript instructions set the background color to key, fill the background, create and fill the magenta diamond shape, and then create and fill the cyan triangle.

Returning to FIGS. 2 and 3, the preferred embodiment of the invention will now be described in greater detail. The input page 300 (FIG. 3) is first "divided" by a grid 310 to determine a set of tiles. Each of the tiles is typically square, and of a convenient size according to the output page coordinate system. The tiles need not be of any particular size.

A particular exemplary tile 3 12 is thus selected in step 206 (FIG. 2) by simply determining the coordinates of its associated clipping window.

The coordinates of the clipping window for the current tile 312 and the current Postscript instruction are then passed to the Postscript interpreter 210 to determine the edge data 614. In one preferred embodiment, the Postscript interpreter 210 produces a rasterized version of the tile 312 as a bit map wherein each of the pixels comprising the tile is represented, or rendered, as a pixel data value. For example, referring to FIG. 6, if the tile 312 consists of a 64 by 64 array, an array of pixel data values is created, by interpreting the Postscript instruction within the proper clipping window. Each pixel data value typically specifies the cyan, magenta, yellow and key color intensities for its corresponding pixel on the output page. The size of each pixel, or resolution used to render the tile 312, depends upon the desired trap line width.

As per the Postscript language, subsequent instructions selected by repeated passes through steps 208, 210, and 211 simply overwrite the bit map. Once all of the Postscript instructions are processed, the rasterized tile 312 is then analyzed in step 212 to produce edge data 614 in a form such as that shown in FIG. 6. The edge data 614 completely describes the tile 312 as a set of vectors, with the vector coordinates typically specified in the local tile coordinate system.

For example, the output of edge converter 212 for the illustrated edge data 614 in FIG. 6 indicates that the tile 312 has two edges which partially coincide, where the background is yellow. The first edge runs from a tile-left side y-coordinate of 48 to a tile-right side y-coordinate of 10. The color enclosed by this edge is cyan. The second edge runs from the left-side y-coordinate of 13 to a tile top-side y-coordinate of 48, and has an intersecting point at (22, 35), with the enclosed color being key.

The edge converter 212 preferably operates on the bit map by a known method of generating histograms from the pixel data values, and then comparing the pixel data value histograms to templates which represent various arrangements of edges. For further details of the preferred technique used by edge converter 212, please refer to U.S. Pat. No. 5,226,175, entitled "A Technique for Representing Sampled Images," which has already been incorporated by reference.

In an alternate embodiment, the Postscript interpreter 210 may operate without creating a bit map for the tile 312. For example, it may create an array of tiles as a hierarchical data structure. Each Postscript instruction is then processed by projecting the specified object into a number of clipping windows specified by the array of tiles. The specified object representation is stored as a list of vectors associated with each tile. As the input data various vectors are in turn added to each tile. In such an embodiment, edge converter 212 analyzes the resulting vector list to determine what would be visible in each tile when rendered.

In any event, the trapping analyzer 214 then takes the edge data 614 and produces a list of vectors and associated color information that describe the boundaries in each tile. For example, the trapping analyzer 214 determines that the exemplary tile 312 consists of three vectors as follows:

| VECTOR COORDINATES | LEFT COLOR | RIGHT COLOR |
| --- | --- | --- |
| (0,48) TO (22,35) | CYAN | KEY |
| (22,35) TO (63,10) | CYAN | YELLOW |
| (0,13) TO (22,35) | KEY | YELLOW |

It may be necessary, wherever a vector coincides with the tile grid 310, to examine adjacent tiles to determine the color information.

The trapping analyzer 214 then typically translates the vectors from the tile coordinate system (that is, 64 by 64) to the coordinate system used by the output page; in default Postscript units (points), the vectors are translated to the three vectors 710 shown in FIG. 7. Each of the vectors thus consists of a starting point, an ending point, a left-hand color and a right-hand color.

The trapping analyzer 214 then takes this vector description 710 of the edges in the tile 312 and performs the desired trapping. In the embodiment being described, a simple set of trapping rules is used. The first rule is to assign a relative darkness value to each color, with key being the darkest color, cyan being a middle darkness color, and yellow being the lightest color. A second rule specifies that at each color transition, the lighter color is to be "spread under" the darker color. Each trap vector is thus created by offsetting the associated edge by one-half the desired trap width toward the side of the darker color; the trap vector is drawn in a color which is a function of the two colors abutting each side of the edge.

Trap vectors are stroked with a line width equal to the desired trap width. As previously mentioned, the desired trap width typically depends upon the resolution of the page setter 120.

Thus, for a one-point trap width, the trapping analyzer 214 outputs the three trap vectors 810 shown in FIG. 8.

It should be understood that the invention is not intended to be limited to any particular set of trapping rules 160, and that a different set of trapping rules 160 would select different colors or position the trap vector data 810 somewhat differently.

As per step 216, the Postscript generator takes the resulting trap vectors 810 and converts them to a set Postscript form vectors 910, as shown in FIG. 9.

Finally, per step 220, in the case of a Postscript input page 300, the trap vectors 910 may be simply appended to the end of the input page data 300, since they overwrite data positioned earlier in the page description. However, an implementation of the invention for other page description languages in which subsequent objects do not simply overwrite previous objects requires that the merging of the original data structure and the trap vectors occur somewhat differently.

A typical problem with prior art solutions to trapping is that traps created for a trap object can extend into nearby adjacent page objects and, if the trap is wider than a nearby adjacent object, beyond the opposite edge of the object. This is referred to throughout the remainder of this discussion as a "thin-element" problem or identified as "thin-element" traps. The consequences of such solutions is that traps may appear against the edges or boundaries of nearby adjacent objects, i.e., boundaries of objects other than the boundary for which the trap was generated. It should be noted that the background against which a page object is positioned may also be considered an "object" in this context. This will be more apparent after the following discussion. An example of a thin-element problem is illustrated in FIGS. 10A–10C.

Figure 10A:
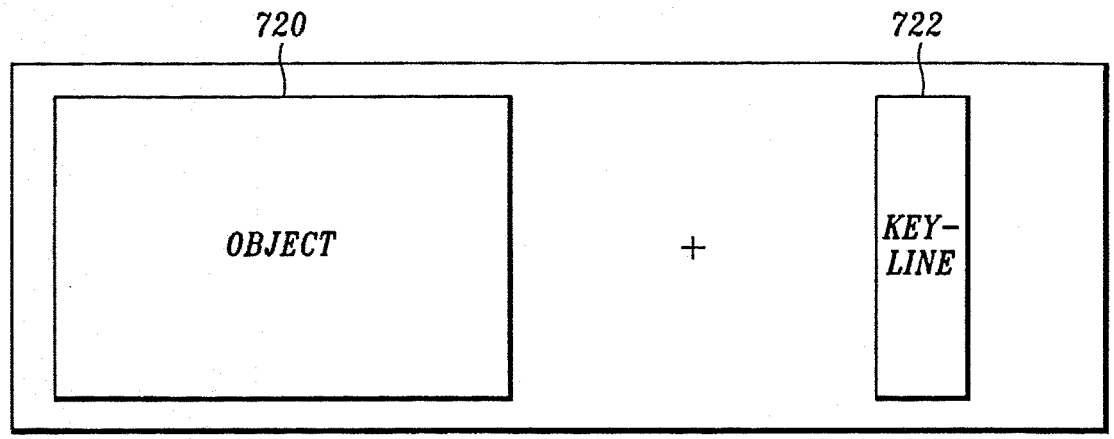
FIGS. 10A–10C illustrate a disadvantage of traditional electronic trapping methods wherein the resultant trap can extend beyond the extreme edge of a nearby page object.
Figure 10B:
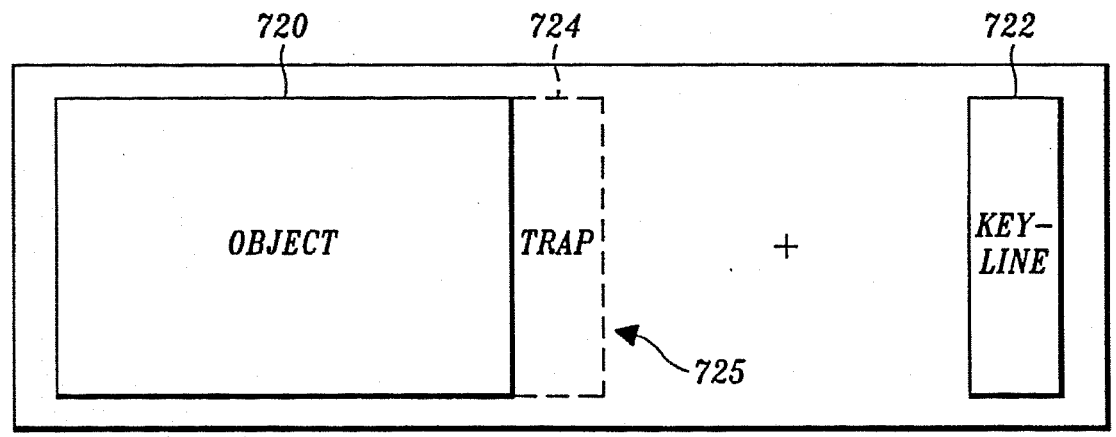
Figure 10C:
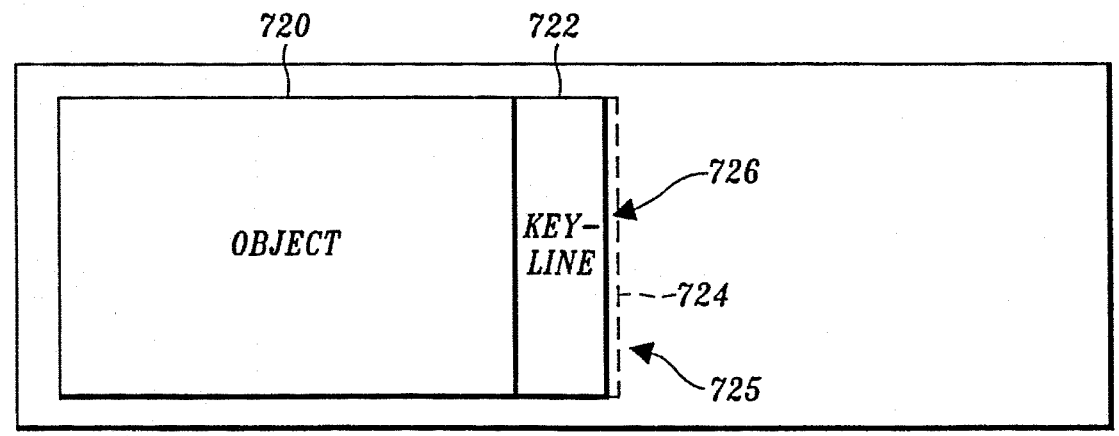

In FIG. 10A, an object 720 has a keyline 722 on the right edge thereof. Keylines are generally very thin design elements that, for example, are often used as a border around an object. In FIG. 10A, it is assumed that the object 720 is to be trapped into the keyline 722. A trap 724 is created, as illustrated in FIG. 10B, to ensure that misregistration between the object 720 and keyline 722 does not result in a white or other unacceptable color between the object and the keyline. However, because the keyline is relatively thin, a thin-element situation is present, as discussed above. In primitive trapping solutions, the trap may extend beyond the right-hand boundary of the keyline, which is highly undesirable. A more acceptable, but less than ideal, prior art solution is to account for the thin-element problem by clipping or stopping the extreme (or far) edge 725 of the trap at the point where it intersects a new boundary or edge, i.e., limit the width of the trap 724 to the width of the keyline 722. However, this is only a partial solution because misregistration can offset the keyline from the extreme edge 725 of the trap, causing a spurious color area 726 to appear at the extreme edge, as is shown in FIG. 10C.

Figure 11:
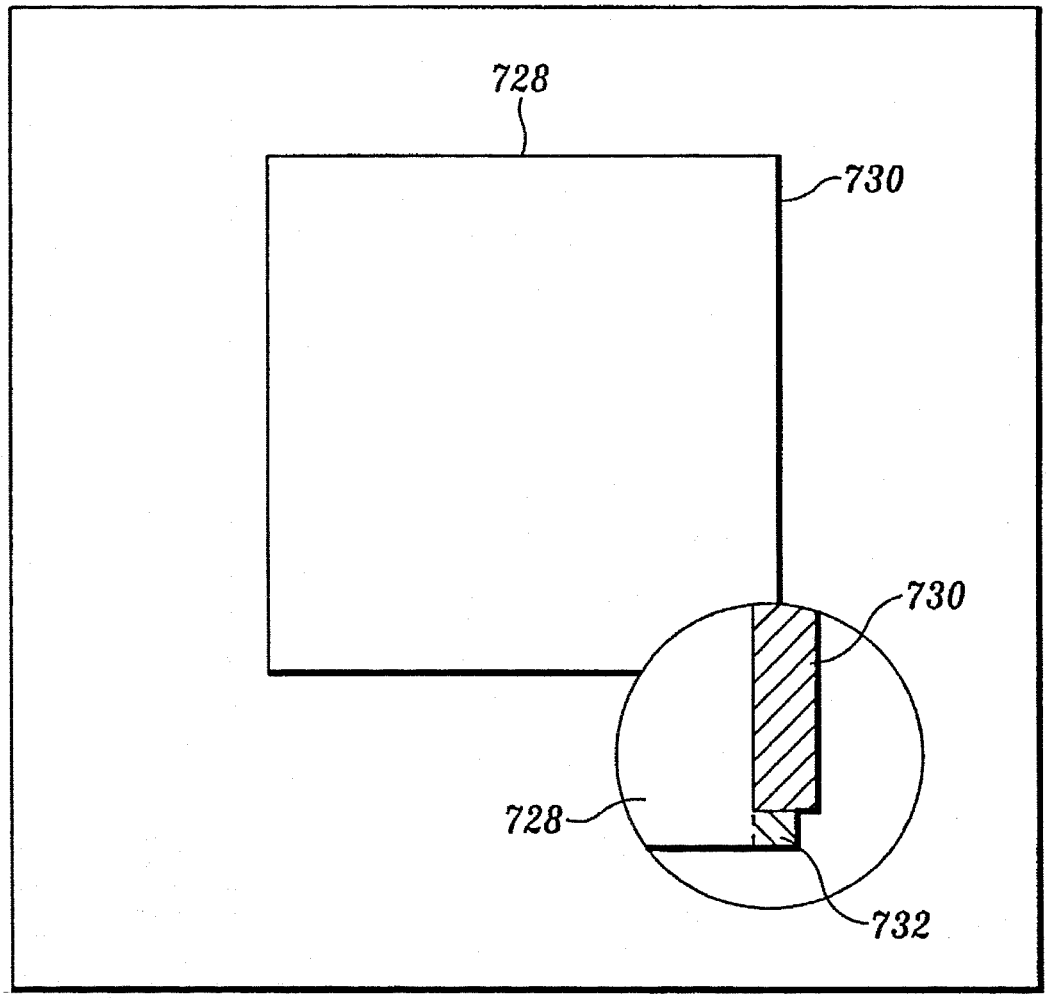
FIG. 11 illustrates an exemplary solution to the trapping problem set forth in FIGS. 10A–10C in accordance with the invention.

The present invention mitigates problems associated with thin elements by not only ensuring that a trap does not extend to the extreme edge of such thin elements, but also modifying the trap width for traps extending into thin elements such that the modified trap extends only partly across the thin element. An example of such a trap modification in accordance with the invention is illustrated in FIG. 11. A rectangular object 728 includes a keyline 730 that extends the length of the right-hand side of the object. A trap 732 is created that extends only partially into the keyline 730. In an actual embodiment of the invention, the thin-element trap is restricted to half the element's width. In this manner, a slight misregistration of the colors in the keyline versus the trap will not cause a spurious color area at the outer edge of the keyline. As will be appreciated, this is a significant improvement over the prior art solutions discussed above.

The following is a general discussion of a preferred method of the invention used by a desktop publishing system to compensate for thin-element traps. Prior to discussing the invention, a number of terms that will facilitate an understanding of the invention are defined.

Candidate Trap Area: This is a proposed trap area that may be modified if it is determined that objects or existing traps are too close to the object being trapped; this area is also the trap area under prior art solutions.

Color Region: An area on a page having similar or identical color characteristics. A page object may include one or more color regions.

Determination of Which Pixel Wins: When a proposed trap pixel is compared to an existing trap pixel, the preferred role is that the pixel with the higher neutral density will specify the color for that area (raster approach).

Existing Trap: A trap that has been generated for an object other than the object currently being trapped.

Exclusionary Zone: An area that is defined around an object intersecting a candidate trap area or a proximity area that is used to modify the candidate trap.

Page Object: Any text, graphic or image on a page of a publication that may need to be trapped. Also referred to as simply "object" throughout parts of the specification.

Proposed Trap Pixel: A pixel that will be written as part of a current trap unless the trap is to be modified due to its proximity to other objects or existing traps. Proposed trap pixels are used in the raster approach when determining the portion of the candidate trap area that will become a trap.

Proximity Area: An area that extends outwardly from the candidate trap area to determine nearby objects that fall within a specified distance from the candidate trap area.

Resultant Trap: The trap that is actually placed for a given object. The resultant trap will be equal to the candidate trap area less any modifications due to page objects or existing traps that are near the object being trapped.

Trap Width: Generally, a trap's width dictates its size, because modifications are not usually made to the length of a trap.

Visible Color Areas: Those areas of an output page that are perceptible or not hidden after rasterizing a tile (raster approach); or clipping objects within a tile (vector approach).

EXEMPLARY RULES FOR MODIFYING TRAPS

Rule 1: When a candidate trap intersects an existing trap, the resulting trap is determined by which trap has the greater neutral density.

Rule 2: When a candidate trap intersects a page object, an exclusionary zone around the page object is defined. The candidate trap's width is reduced based upon the width of the exclusionary zone. In one actual embodiment, the exclusionary zone is never more than one-half the distance between the originating edge of the trap and the page object.

Rule 3: A proximity area is defined around the original candidate trap area. When a page object intersects the proximity area, the candidate trap area is reduced based upon the width of the exclusionary zone, in a manner that is the same or similar to Rule 2.

As an alternative to computing the exclusionary zone, as described in Rule 2, the exclusionary zone may be based on a fixed width such as a percentage of the proposed trap width. An alternative embodiment for determining which pixel wins, instead of merely selecting either the existing or proposed trap color, a third color or trap may be created by blending the candidate trap with existing traps according to a set of rules. These rules may include blending the inks in the two traps in such a way as to maintain the visual edge of the darker trap while including ink from the lighter trap. Total ink in the resulting joined trap is reduced by an amount which retains the integrity of the trap colors and still remains suitable for printing purposes.

Figure 12A:
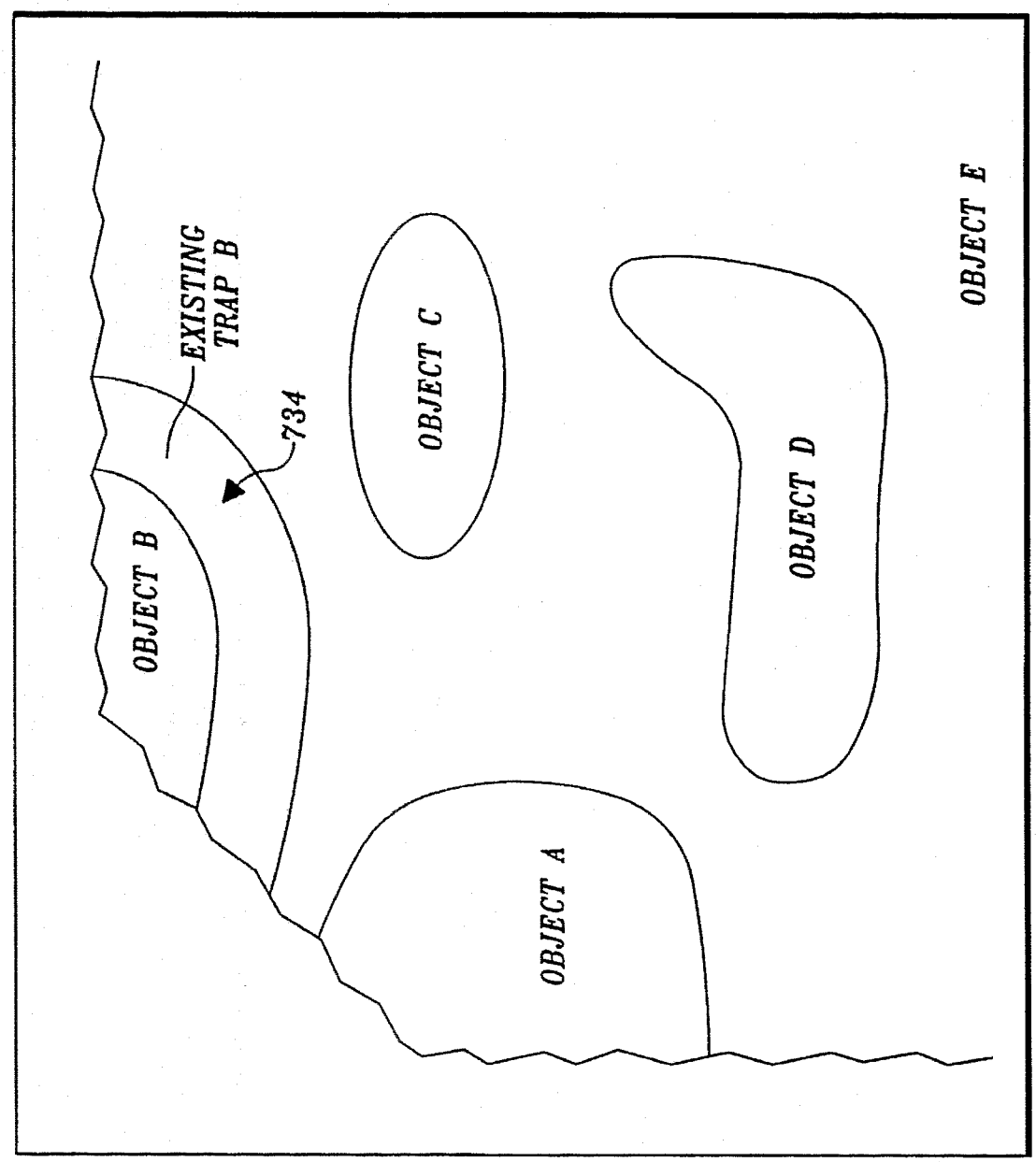
FIG. 12A is a page having a number of illustrative objects that are used in describing a trapping solution in accordance with the invention.

FIGS. 12A–12D show the interaction between a number of Objects A, B, C, D, and E (background) on a page to illustrate the concepts presented above. With reference to FIG. 12A, the following assumptions are applicable. Object A is an object that is to be trapped as a result of its intersection with the background, Object E. Object B has an existing trap 734, labeled Existing Trap B. Finally, Objects C and D do not include any traps.

Figure 12B:
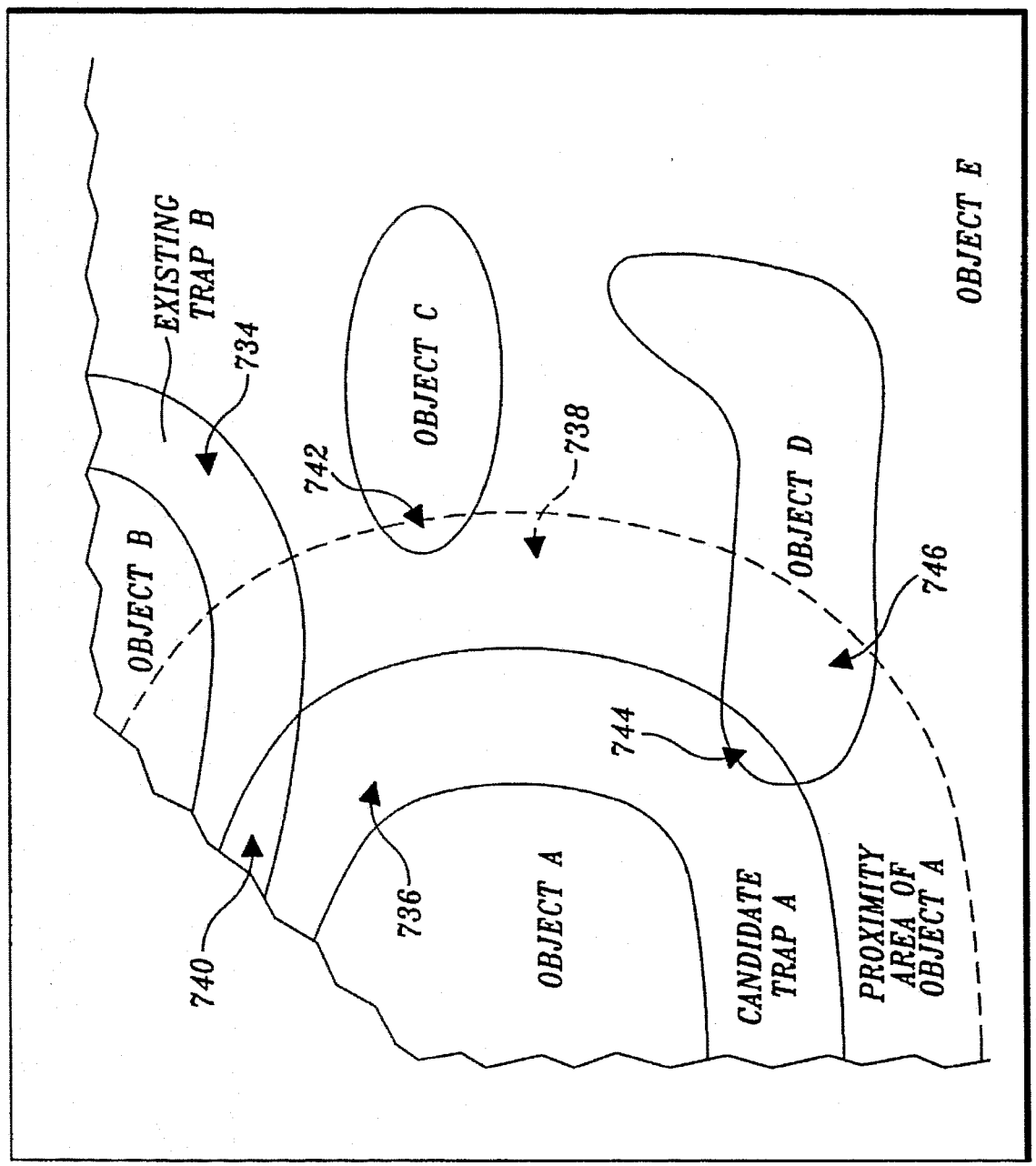
FIG. 12B illustrates a candidate trap area and proximity trap area for Object A.

In FIG. 12B, a candidate trap area 736 and a proximity area 738 for Object A are designated as shown. Looking to the interaction of these areas with the page objects and existing traps, the Existing Trap B (734) overlaps an upper portion of the candidate trap area 736. The overlap region is designated by reference numeral 740. Object C overlaps the proximity area 738 to create an overlap region 742. Further, Object D extends into both the candidate trap area 736 and proximity area 738, creating two overlap regions designated by reference numerals 744 and 746, respectively.

Figure 12C:
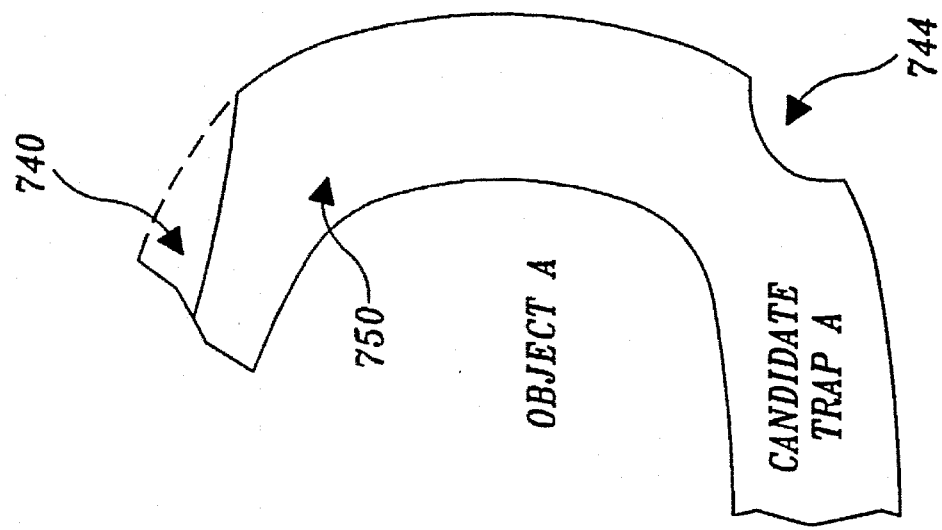
FIG. 12C illustrates a prior art solution to the trapping problem set forth in FIG. 12A.

FIG. 12C illustrates what a resultant trap 750 may look like under the most advantageous of the prior art solutions discussed above. In FIG. 12C, it is assumed that the prior art has the capability of detecting the intersection of two traps, as shown by the overlap region 740, and then making a determination as to which trap should take precedence. The trap for Object B is assumed to have precedence in the example, and thus the overlap region 740 has been removed from the resultant trap 750. The overlap region 744 is the result of an intersection with an object, Object D, and this is also removed from the resultant trap 750. This solution is disadvantageous because there is potential for spurious color areas along the boundary separating the resultant trap and any page object intersections, such as the one with Object D, if misregistration should occur.

Figure 12D:
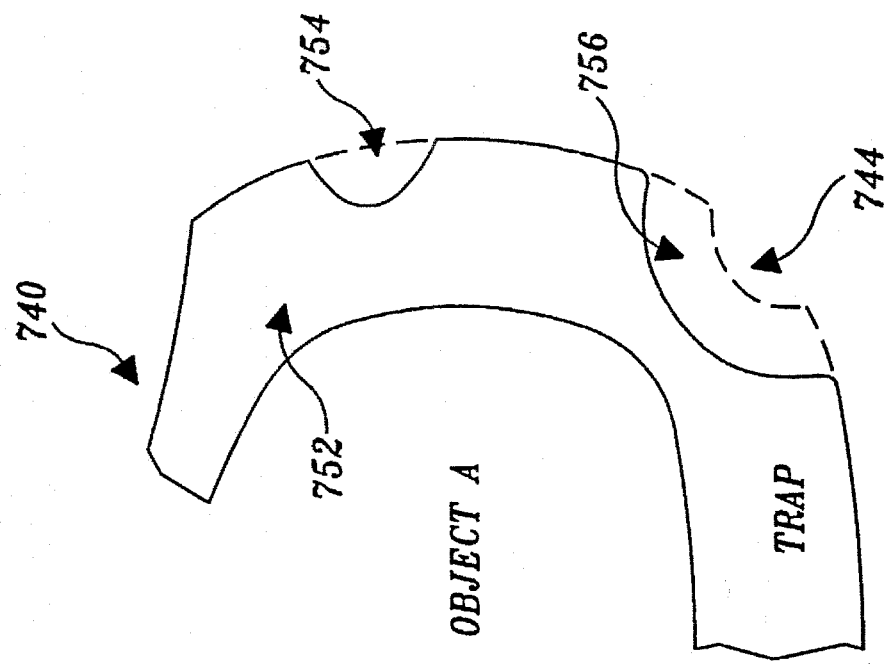
FIG. 12D illustrates an exemplary trapping solution for the trapping problem set forth in FIG. 12A in accordance with the invention.

FIG. 12D illustrates a trap 752 that may result aeter an analysis of the page objects in FIG. 12A by a desktop publishing system incorporating the process of the present invention. The overlap region 740 will remain cutout if it is assumed that the neutral density of Object B is greater than that of Object A. Otherwise, the overlap region 740 would remain in the trap 752. In contrast to FIG. 12C, the trap 752 has also been modified in other areas, according to the rules outlined above, as a result of the intersection of Object C with the proximity area 738. See cutout 754. Another change is that the cutout of the trap 752 that accommodates Object D has been increased as indicated by reference numeral 756. Thus, not only is the object itself removed from the trap 752, but an additional exclusionary zone is added. This is an advantage over the prior art solution because it avoids the misregistration problem discussed above.

The following sets forth two exemplary software embodiments of the invention for creating and detecting thin-element traps in accordance with the invention. With reference again to FIG. 2, there are a number of methods of implementing the edge converter 212 and trapping analyzer 214. In one described embodiment, these blocks are achieved by rasterizing the input page data 300 to create a bit map representation of each tile and then using the bit map representation to create traps. This embodiment is generally referred to as a raster approach to trapping. In another described embodiment, the edge converter 212 and trapping analyzer 214 blocks are achieved by creating a vector list of each object in a tile and then using the vector list to create traps. This embodiment is generally referred to as a vector graphic-based or vector approach to trapping.

Figure 13:
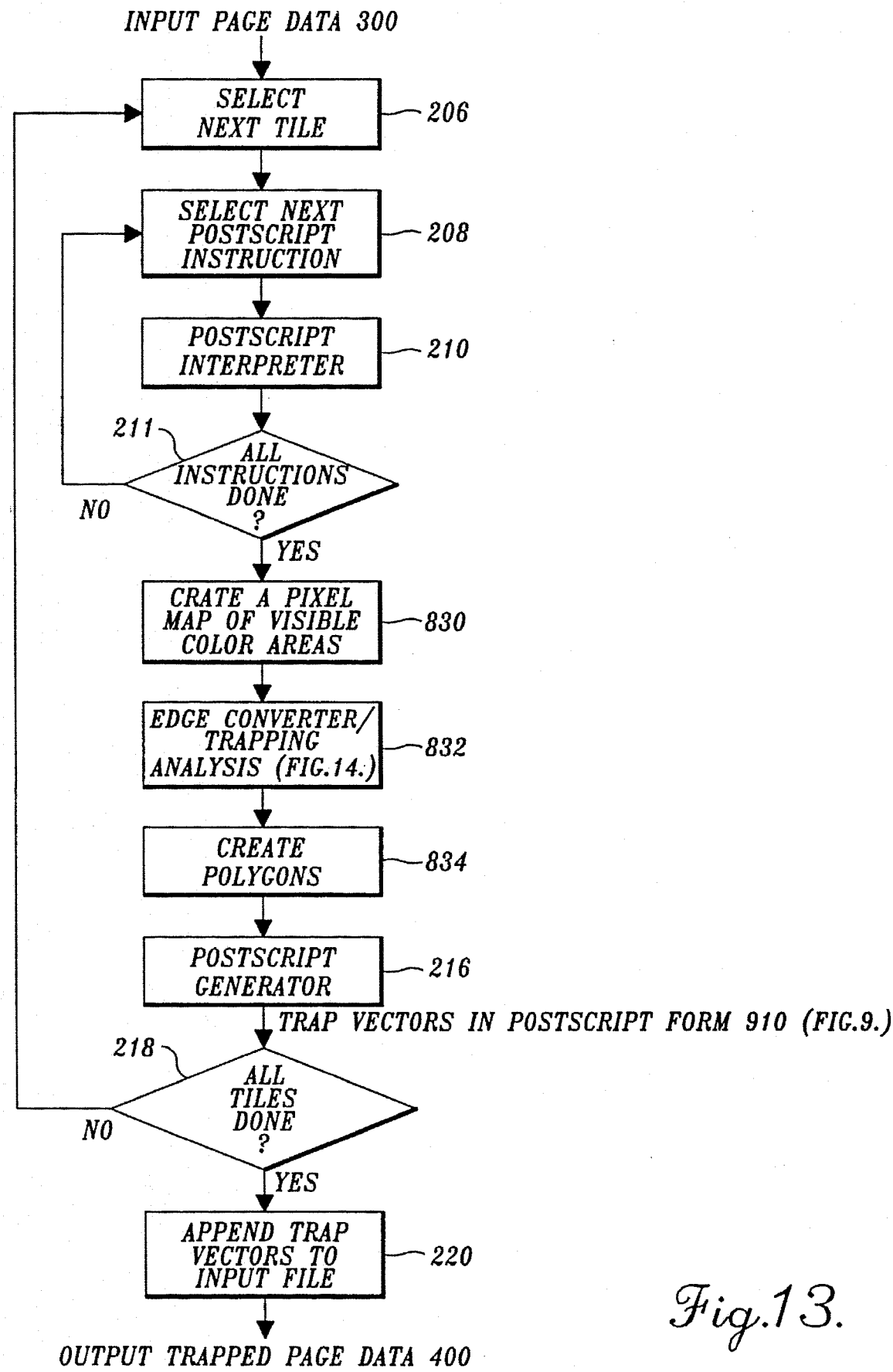
FIG. 13 is a flow diagram of a second exemplary routine that may be used by the desktop publishing system for creating traps in accordance with the invention.
Figure 18:
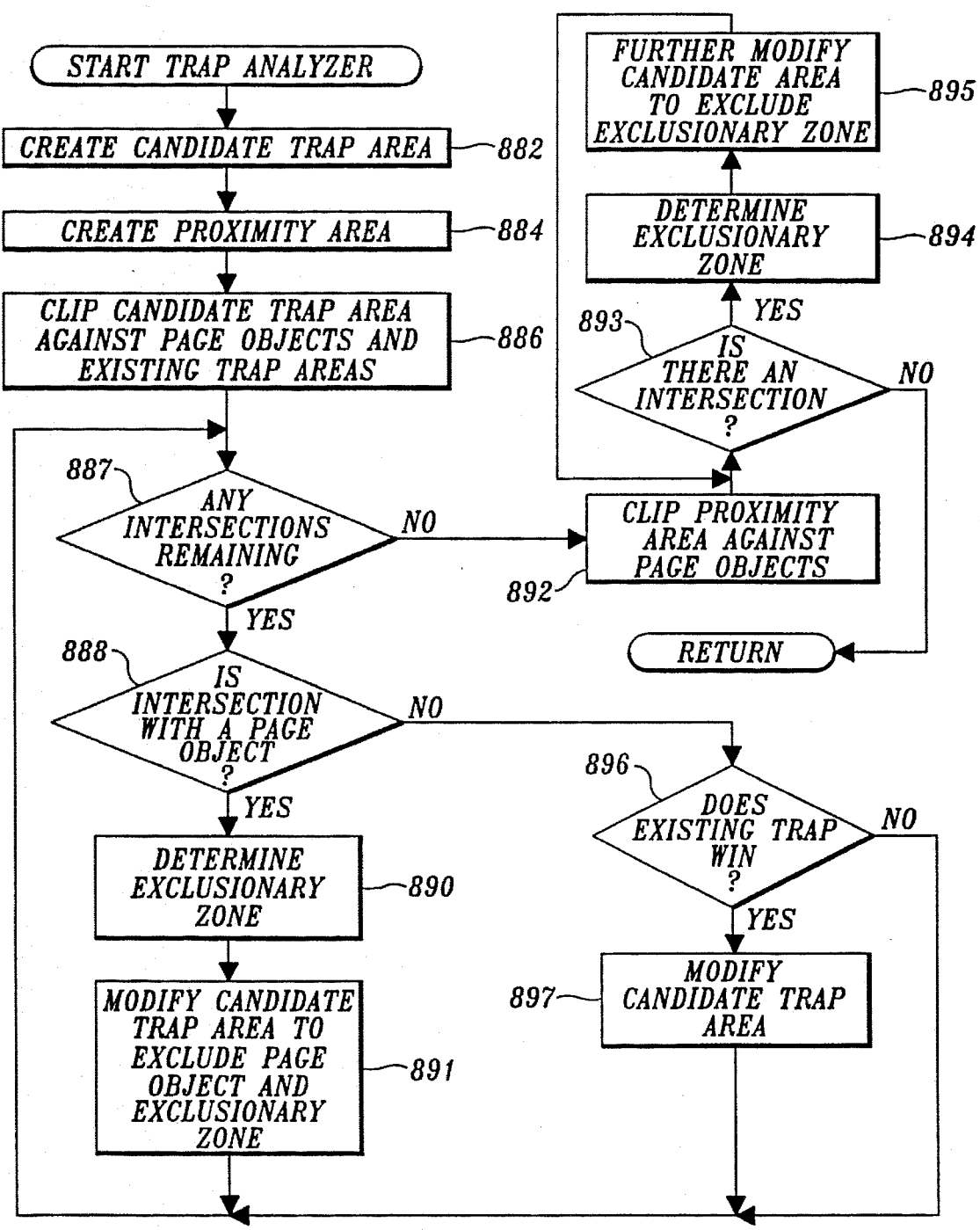
FIG. 18 is a flow diagram of a routine for determining those boundaries to be trapped and the size of the trap for use in the routine of FIG. 17.

FIGS. 13 and 18 are flow diagrams that illustrate exemplary routines for creating traps that take into account the thin-element problem using the raster and vector approaches, respectively. Many of the blocks in FIGS. 13 and 18 are identical to those in FIG. 2, and these have been designated with the same reference numerals. The raster-based approach is considered first.

With reference to FIG. 13, as is stated above, at blocks 206–211 the CPU 102 interprets each of the PDL instructions in the input page data 300 and creates tiles that are representative of the data in the output page. The interpretation of each Postscript instruction in a tile produces a display list representation that indicates the possible boundaries, or edges, between regions of different colors as they will appear on the output page. In an actual embodiment of the invention, the display list is created by first selecting a Postscript instruction at block 208, and then interpreting the instruction at block 210 by evaluating it within a clipping window which corresponds to the currently selected tile. Blocks 208 and 210 are repeated until all of the Postscript instructions for the current tile have been interpreted. This is accomplished using block 211. The display list for the current tile is then complete. Those skilled in the art will appreciate that other methods of creating display lists may be implemented within the scope of the invention.

Figure 14:
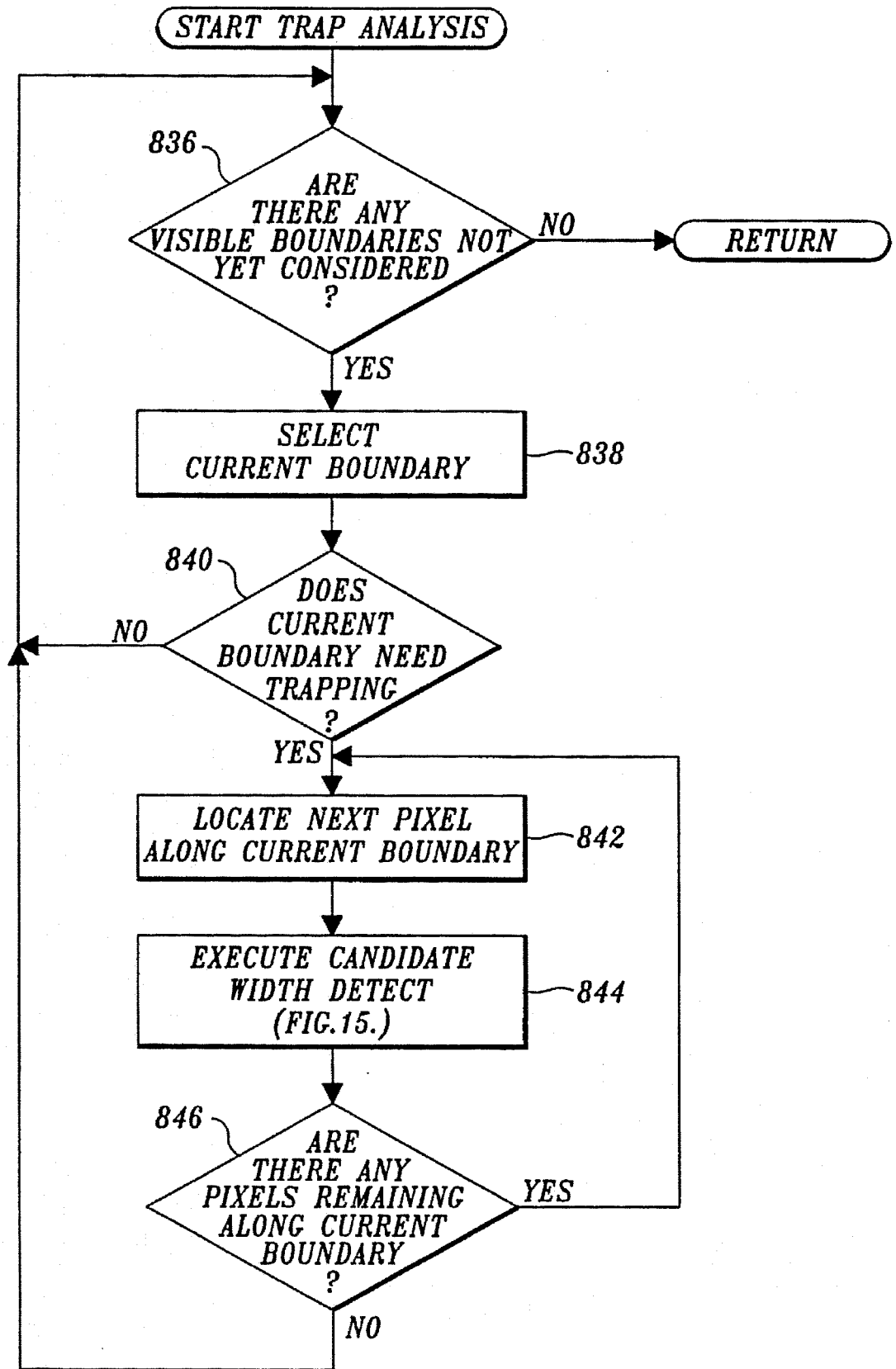
FIG. 14 is a flow diagram of a routine for determining those boundaries to be trapped and the size of the trap for use in the routine of FIG. 13.

At block 830, the display list from blocks 208 and 210 is rasterized to create a pixel map of visible color areas for the current tile. At block 832, an edge converter/trapping analysis subroutine is called to determine where traps are to be created, according to a set of trapping rules, and taking into account the proximity of adjacent page objects and existing traps. A routine suitable for carrying out the function of block 832 is illustrated in FIG. 14 and described below. In the preferred embodiment of the invention, the traps are created on a pixel-by-pixel basis by changing the color of those pixels around a boundary to be trapped. At block 834, an edge-following algorithm, such as the one used in block 212 in FIG. 2, is used to create polygons in the form of trap vectors 810 from groups of pixels that were modified in block 832 having the same color characteristics.

Block 216 then converts the trap vectors 810 to PDL form. A test is made at block 218 to determine whether all of the tiles have been analyzed. If there are additional tiles to be reviewed, the routine loops to block 206. Otherwise, at block 220 the trap vectors in PDL form are appended to the end of the input page data 300, producing a trapped output page data 400. The routine then terminates.

FIG. 14 illustrates an exemplary routine suitable for use in FIG. 13 (block 832) for determining those intersections or boundaries to be trapped within a tile. As an overview, the process described by the routine works generally as follows: A boundary between two color areas is selected. Assuming the boundary needs to be trapped, a pixel adjacent the boundary is selected and analyzed. The boundary pixel, and a number of pixels adjacent the boundary pixel equal to the trap width less the boundary pixel, are designated as "proposed trap pixels" as defined above. The proposed trap pixels are sequentially analyzed, beginning with the boundary pixel, to see if they intersect an existing trap pixel or a page object.

Intersection With an Existing Trap Pixel: If a proposed trap pixel overlaps an existing trap pixel, a test is made to determine whether the proposed trap pixel should overwrite or replace the existing trap pixel, e.g., based upon the neutral density of each pixel. If, based upon the results of the test, the existing trap pixel is to remain, the analysis for that row of proposed trap pixels, comprising the width of the proposed trap, is complete. Thus, the next pixel adjacent the boundary is identified and evaluated. On the other hand, if a proposed trap pixel is to replace an existing trap pixel, the color of the pixel in question is modified accordingly and the next adjacent proposed trap pixel, if any are left, is evaluated to see if it also intersects with an existing trap pixel.

Intersection With an Object Pixel: If a proposed trap pixel does not intersect an existing trap pixel, a test is made to determine whether the proposed trap pixel overlaps an object pixel. If an object pixel is overlapped, the size of the trap is reduced according to Rule 2 above. If a proposed trap pixel does not overlap an object pixel, the appropriate color is written to the proposed trap pixel such that it becomes a part of the current trap.

Upon evaluation of all the proposed trap pixels along the width of a current row in the proposed trap, a proximity detect is instituted to determine if all of the proposed trap pixels along the current row are to remain in the current trap. As will be appreciated from the above, a proximity detect for any given row of proposed trap pixels will occur if none of the proposed trap pixels in the row intersected an existing trap or a page object; or, if upon intersecting an existing trap, it was determined that the proposed trap pixels should replace the existing trap pixels. In an actual embodiment of the invention, the width of the proximity check will be equivalent to the trap width. Thus, the proximity of pixels will begin at a position adjacent to the last proposed pixel in any given row, and extend outwardly therefrom the same number of pixels that are in the proposed trap width. Put simply, if any of the proximity pixels overlap an object pixel, the size of the trap will be reduced according to Rule 3. Otherwise, the size of the trap remains as determined prior to the proximity detect.

With reference again to FIG. 14, a test is made at block 836 to determine whether there are any visible boundaries in the current tile that have not yet been considered. Visible boundaries are boundaries that are formed by the intersection of two or more page objects or the intersection of a page object with the background. If there are visible boundaries left, the next or "current" boundary to be considered is selected at block 838. At block 840, a test is made to determine whether the current boundary needs trapping. If the current boundary does not need trapping, the routine loops to block 836. Otherwise, at block 842 the next pixel along the current boundary is located. The width of the trap for the current boundary is determined at block 844. The width of the trap will be a predetermined number of pixels, e.g., six, unless reduced because of the trap's proximity to existing trap or page object. A suitable subroutine for making the width determination is illustrated in FIG. 15 and described below.

A test is made at block 846 to determine whether there are any pixels remaining along the current boundary. If there are pixels remaining along the current boundary, the routine loops to block 842. Otherwise, the routine loops to block 836 where it is determined if there are any visible boundaries not yet considered. If, at block 836, it is determined that all of the visible boundaries have been considered, the routine returns to block 834 of FIG. 13.

Figure 15:
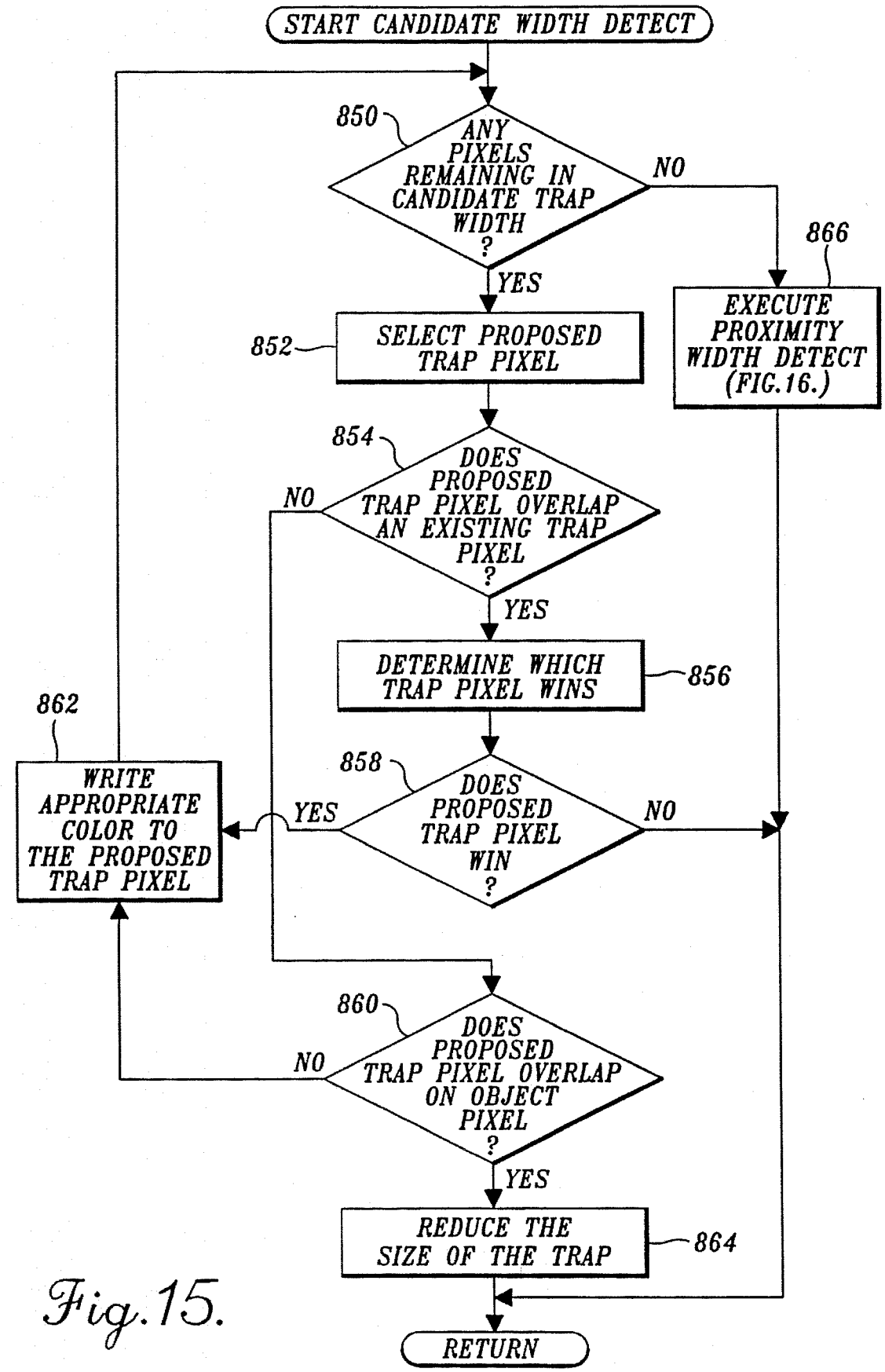
FIG. 15 is a flow diagram of a routine for determining when the proximity of nearby page objects or existing traps is such that a modification should be made to the trap area.

FIG. 15 illustrates an exemplary subroutine for determining the width of a current trap to be placed along a boundary line, while taking into account adjacent page objects and existing traps. The subroutine adjusts the size of one of the traps if a proposed trap overlaps an existing trap. The subroutine modifies the size of the current trap if the current trap intersects a page object or is considered to be too close to a page object. A test is made at block 850 to determine if any pixels are remaining in the trap width or, in other words, to determine whether the analyses of the current row of pixels in the current trap is complete.

If there are pixels remaining to be considered, a proposed trap pixel is selected at block 852. A test is then made at block 854 to determine whether the proposed trap pixel overlaps an existing trap pixel, i.e., a trap pixel was created along a boundary other than the current boundary. If the proposed trap pixel does overlap an existing trap pixel, at block 856 it is determined which trap pixel "wins," i.e., which pixel should remain as a trap pixel for this particular boundary, with the other trap area being modified. In an actual embodiment, this determination is made by looking to the neutral densities of each trap area, and modifying the trap area with the lesser neutral density. Thus, if the proposed trap pixel has a neutral density which is greater than that of the existing trap pixel, the proposed pixel will be substituted for the existing trap pixel. In the alternative, the existing trap pixel remains. A test is then made at block 858 to determine if the proposed trap pixel wins.

If the proposed trap pixel does not win, the pixel in question remains the color of the previous trap, and the routine returns. If the proposed trap pixel did win, the existing trap pixel is modified to the color of the proposed trap pixel at block 862. The routine then loops to block 850.

If the proposed trap pixel does not overlap an object pixel, as determined in block 854, a test is made at block 860 to determine whether the proposed trap pixel overlaps an object pixel. If the proposed trap pixel does not overlap an object pixel, the color of the current trap is written to the proposed trap pixel, such that that pixel becomes a part of the current trap, and the routine loops to block 850. If the proposed trap pixel overlaps an object pixel, the size of the trap is reduced at block 864, and the routine returns to FIG. 14.

With reference again to block 850, if there are not any pixels remaining to be considered in the trap width, at block 866 proximity pixels are added to the trap width to determine if there are any page objects that might affect the size of the resultant trap, according to the rules outlined above. A routine for making this determination is set forth in FIG. 16 and set forth below. It will be appreciated that the routine of FIG. 16 need not be called for any row in which one or more of the proposed pixels comprising the row intersect with an existing trap or page object. This is evident from the branching occurring at decision blocks 858 and 860.

Figure 16:
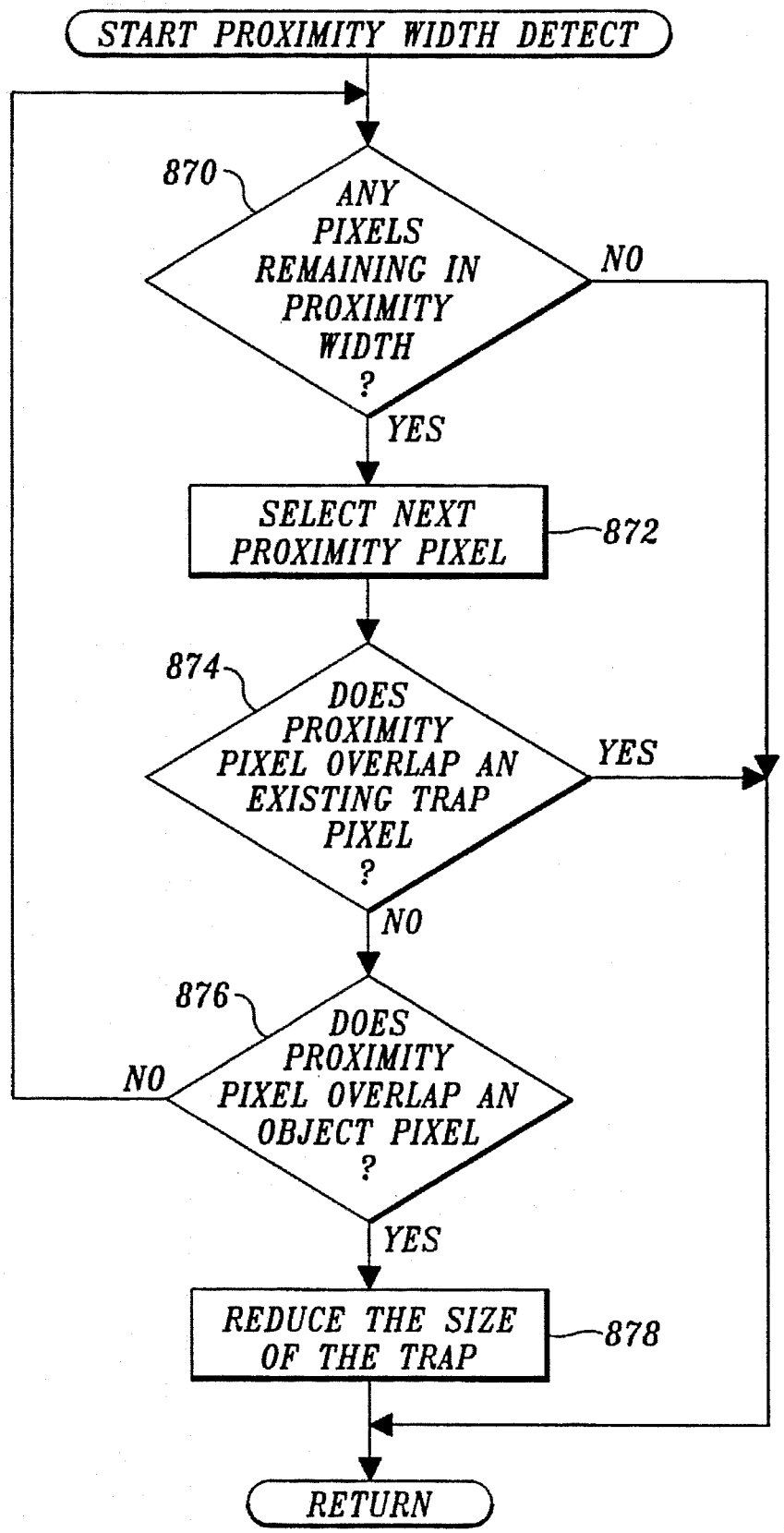
FIG. 16 is a flow diagram of a routine for determining if two traps are in such close proximity that the trapping rules will be compromised if the traps remain as originally created.

FIG. 16 illustrates an exemplary subroutine for determining when two traps are in such close proximity that the trapping rules will be compromised if both traps remain as originally created. A test is made at block 870 to determine whether any pixels are remaining in the proximity width. As is stated above, in an actual embodiment of the invention, the width of the proximity check will be equivalent to the trap width. If all of the proximity pixels for a row of pixels have not been considered, the next pixel in the row is selected at block 872.

A test is made at block 874 to determine whether the proximity pixel overlaps an existing trap pixel. If there are no pixels remaining in the proximity width, or if the proximity pixel overlaps an existing trap pixel, the program terminates and control returns to FIG. 15. Otherwise, if the proximity pixel does not overlap an existing trap pixel, a test is made at block 876 to determine whether the proximity pixel overlaps an object pixel. If the proximity pixel does not overlap an object pixel, the routine loops to block 870. Otherwise, the size of the trap is reduced at block 878 according to the trap reduction rules set forth above, i.e., Rule 3. The routine then terminates, and control is returned to the routine of FIG. 15.

Figure 17:
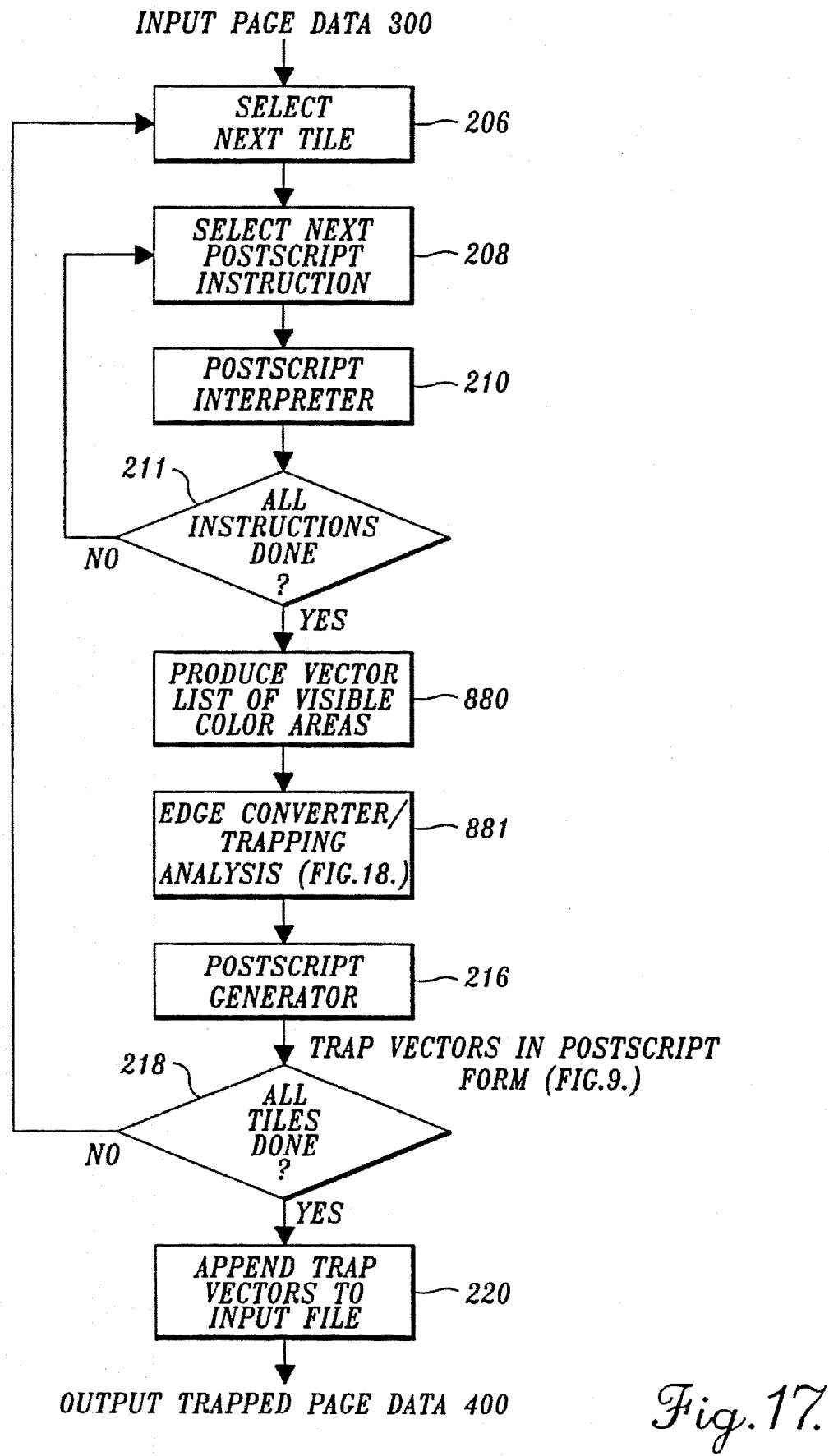
FIG. 17 is a flow diagram of a third exemplary routine that may be used by the desktop publishing system for creating traps in accordance with the invention.

FIGS. 17 and 18 are directed toward the vector graphic-based approach to trapping. With reference to FIG. 17, at blocks 206–211 the CPU 102 interprets each of the PDL instructions in the input page data 300 and creates a display list that is representative of the data in the output page. Once the display list is created, at block 880, a vector list of visible color areas in the current tile is produced by utilizing hidden surface removal techniques of the objects in the display list. Such techniques are known in the art. One method of accomplishing hidden surface removal is to clip all background objects against the foreground objects, beginning with the foremost object and working back. At block 881, an edge converter/trapping analysis subroutine is called to determine where traps are to be created according to a set of trapping rules and taking into account the proximity of adjacent objects and traps. A routine suitable for carrying out the function of block 881 is illustrated in FIG. 18 and described below.

In block 216, the trap vectors created in block 881 are converted to PDL form. A test is made at block 218 to determine whether all of the tiles have been analyzed. If there are additional tiles to be reviewed, the routine loops to block 206. Otherwise, the trap vectors in PDL form are appended to the end of the input page data 300 at block 220, producing a trapped output page data 400. The routine then terminates.

FIG. 18 is a routine suitable for use in FIG. 17 for determining those boundaries or intersections within a current tile that are to be trapped and the width of the trap. At block 882, a candidate trap area is created. At block 884, a proximity trap area is created. In one embodiment of the invention, these areas are of equal width, with the candidate trap area being adjacent the page object being trapped and the proximity trap area being adjacent the candidate trap area. The candidate trap area is clipped against the page objects and any existing trap areas at block 886. This results in a list of all intersections between the candidate trap area and these objects.

A test is made at block 887 to determine whether any intersections remain in the list for the area that was clipped in block 886. If there are intersections remaining to be considered, a test is made at block 888 to determine whether the current intersection is with a page object, i.e., a page object fully encompassed by the tile or a portion of a page object. If the current intersection is with a page object, an exclusionary zone is determined at block 890 and the candidate trap area is modified to exclude the page object and the exclusionary zone at block 891. The routine then loops to block 887.

If the current intersection was not with a page object, it by default is with an existing trap, and a test is made at block 896 to determine if the existing trap "wins" over the candidate trap. Again, in one embodiment, the trap having the greater neutral density will take precedent over the other. If the existing trap takes precedence, the candidate trap area is modified at block 897. The routine then loops to block 887. Otherwise, the candidate trap area is to take precedence over the existing trap area. In this situation, the candidate trap area is not modified, and will occlude the existing trap area. In an alternative embodiment of the invention, the candidate trap area will overwrite the existing trap area. The routine then loops to block 887 to consider the next intersection.

If all of the intersections in the current tile have been considered, as determined in block 887, at block 892 the proximity trap area is clipped against only the page object. The rationale of block 892 is to ascertain whether any page object or portion thereof is too close to be a candidate trap, thereby representing a trap risk where misregistration could cause a worse artifact than not trapping at all. A test is made at block 893 to determine if there are any intersections between page objects and the proximity trap area. If there are none, the routine terminates and control returns to the routine of FIG. 17 (block 881).

If one or more intersections are detected, an exclusionary zone around the detected object area is determined at block 894. See, e.g., Rule 3 above. At block 895, the candidate area is modified to eliminate the exclusionary zone. The routine then loops to block 893 to determine if any other object areas fall within the proximity area. After all of the intersections have been evaluated, the routine terminates.

While the preferred embodiment of the invention has been illustrated and described, it will be appreciated that various changes can be made therein without departing from the spirit and scope of the invention. For example, the proximity detect features of the invention have been discussed in conjunction with a process that (1) converts PDL to an internal format; (2) traps object intersections using the internal format; (3) converts the traps to PDL; and adds the trap vectors to the original PDL tile. However, this implementation is exemplary only, and the proximity detect features of the invention are advantageous in other trapping implementations. Thus, these features are not to be limited to a PDL-in/PDL-out format.

The embodiments of the invention in which an exclusive property or privilege is claimed are defined as follows:

1. A method of electronically trapping a printed color page including a plurality of color regions, the method comprising the steps of:

(a) creating, according to a set of trapping rules, a proposed trap area for a color region of interest;

(b) determining a cutout from the proposed trap area if one or more color regions that do not overlap the proposed trap area are in such close proximity to the color region of interest that an undesirable trap would result without the modification; and (c) creating a resultant trap area for the color region of interest which is equivalent to the proposed trap area less the cutout.

2. The method of claim 1 and further including the step of comparing the proposed trap area to color regions to determine if there are any intersections between the two areas and, if one or more intersections are present, modifying the resultant trap area to exclude the color region or regions from the resultant trap area.

3. The method of claim 2 wherein the resultant trap area is further modified based upon an exclusionary zone that is defined relative to each color region that intersects the proposed trap area.

4. The method of claim 3 wherein for a given color region that intersects the proposed trap area, the exclusionary zone is equal to one-half the distance between the color region of interest and the intersecting color region.

5. The method of claim 2 wherein one or more of the color regions include existing trap areas that were generated prior to determining a trap for the color region of interest, the method further including the step of comparing the resultant trap area to existing trap areas to determine if there are any intersections between the two areas and, if one or more intersections are present, modifying one of the trap areas.

6. The method of claim 5 wherein each color region has a neutral density, each existing trap has a neutral density that corresponds to the neutral density of its associated color region, the resultant trap area has a neutral density that corresponds to the neutral density of the color region of interest, and for any intersection between the resultant trap area and an existing trap area, the trap area with the lower neutral density is the area that is modified.

7. The method of claim 1 wherein any color region that necessitates a cutout of the proposed trap area is called a proximate color region, and wherein the proposed trap area is modified based upon an exclusionary zone that is defined relative to each proximate color region.

8. The method of claim 7 wherein for any proximate color region, the exclusionary zone is equal to one-half the distance between the color region of interest and the proximate color region.

9. The method of claim 1 wherein the color page is expressed in a page description language format, the method further comprising the steps of:

(a) reading an input data file which represents the color page, the input data file including instructions expressed in the page description language that define the color regions in the color page;

(b) translating the page description language instructions comprising the input data file into a format suitable for detection and analysis of color edges between color regions; and (c) analyzing the translated input data file to identify color edges between the color regions, and using the translated input data file to create the proposed trap area.

10. The method of claim 9 wherein one or more of the color regions include existing trap areas that were generated prior to determining the resultant trap area for the color region of interest and further including the step of producing a trapped output file including the existing trap areas, with the resultant and existing trap areas being expressed in the page description language format.

11. The method of claim 10 wherein the format suitable for detection and analysis of color intersections between color regions is a raster format.

12. The method of claim 10 wherein the format suitable for detection and analysis of color intersections between color regions is in a vector list format.

13. The method of claim 12 and further including the step of analyzing the vector list to determine any vectors in the list that are visible.

14. A method of electronically trapping a printed color page including a plurality of color regions, wherein some of the color regions include existing trap areas that were generated prior to determining a trap for a color region of interest, the method comprising the steps of:

(a) creating, according to a set of trapping rules, a proposed trap area for the color region of interest;

(b) comparing the proposed trap area to color regions to determine if there are any intersections between the proposed trap area and the color regions and, if one or more intersections are present, modifying the proposed trap area to exclude the color region or regions from the proposed trap area;

(c) comparing the proposed trap area to existing trap areas to determine if there are any intersections between the proposed trap and existing trap areas and, if one or more intersections are present, modifying one of the trap areas;

(d) creating a proximity area adjacent the proposed trap area for determining the proximity of color regions and comparing the proximity area to the color regions;

(e) further modifying the proposed trap area, based upon the proximity area, if one or more color regions are in such close proximity to the color region of interest that an undesirable trap would result without the modification; and (f) creating an existing trap area for the color region of interest which is equivalent to the proposed trap area less any modifications made to the proposed trap area.

15. The method of claim 14 wherein the color page is expressed in a page description language format, the method further comprising the steps of:

(a) reading an input data file which represents the color page, the input data file including instructions expressed in the page description language that define the color regions in the color page;

(b) translating the page description language instructions comprising the input data file into a format suitable for detection and analysis of color edges between color regions; and (c) analyzing the translated input data file to identify color edges between the color regions, and using the translated input data file to create the proposed trap.

16. The method of claim 15 and further including the step of producing a trapped output file including the existing trap areas, with the existing trap areas being expressed in the page description language format.

17. The method of claim 14 further including repeating steps (a)–(f) for each color region in the printed color page.

* * * * *